US00RE37204E

(19) United States
(12) Reissued Patent
Kompanek

(10) Patent Number: US RE37,204 E
(45) Date of Reissued Patent: Jun. 5, 2001

(54) TRANSDUCER ASSEMBLY

(75) Inventor: Harry W. Kompanek, Santa Barbara, CA (US)

(73) Assignee: Piezo Sona-Tool Corporation

(21) Appl. No.: 09/461,138

(22) Filed: Dec. 13, 1999

Related U.S. Patent Documents

Reissue of:
(64) Patent No.: 5,122,992
Issued: Jun. 16, 1992
Appl. No.: 07/564,777
Filed: Aug. 9, 1990

U.S. Applications:

(63) Continuation-in-part of application No. 07/331,256, filed on Mar. 30, 1989, now Pat. No. 5,020,035.

(51) Int. Cl.[7] ..... H04R 17/00
(52) U.S. Cl. ..... 367/159; 367/162; 310/321; 310/337
(58) Field of Search ..... 367/157, 159, 367/162, 165; 310/321, 322, 337, 369

(56) References Cited

U.S. PATENT DOCUMENTS

| | | | | |
|---|---|---|---|---|
| 2,812,452 | * | 11/1957 | Harris | 367/157 |
| 2,939,970 | * | 6/1960 | Dranietz et al. | 367/157 |
| 3,230,504 | * | 1/1966 | Horan et al. | 367/157 |
| 4,651,044 | * | 3/1987 | Kompanek | 367/159 |
| 4,682,070 | * | 7/1987 | Plambeck | 310/337 |
| 4,887,247 | * | 12/1989 | Black et al. | 367/162 |
| 5,020,035 | * | 5/1991 | Kompanek | 367/162 |
| 5,103,130 | | 4/1992 | Rolt et al. | 310/337 |
| 5,122,992 | * | 6/1992 | Kompanek | 367/159 |

* cited by examiner

*Primary Examiner*—Daniel T. Pihulic
(74) *Attorney, Agent, or Firm*—Burns, Doane, Swecker & Swecker, L.L.P.

(57) ABSTRACT

A support member preferably made of a metal such as cold rolled steel is disposed in a looped configuration and is provided with a gap. A transducer member preferably made of a piezoelectric material such as a ceramic is disposed within the support member. The transducer member is provided with a gap at a position corresponding to the gap in the support member. A closure member made from a suitable springlike material such as an alloy steel is attached to the opposite ends of the support member at the position of the gap as by welding. The closure member extends in a U-shaped configuration into the looped configuration (in section) defined by the support member and the ceramic member. The axial length of the closure member defines the bandwidth of the frequency vibrations generated by the transducer member. When the closure member extends from the gap into the looped configuration to a position near the end of the transducer member and the support member opposite the gap, a bracing member may be disposed between the closure member and the transducer member to brace the closure member. The opposite ends of the closure member are closed as by end caps.

28 Claims, 1 Drawing Sheet

FIG. 1
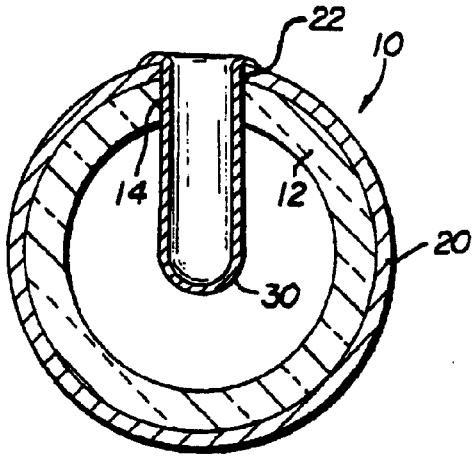
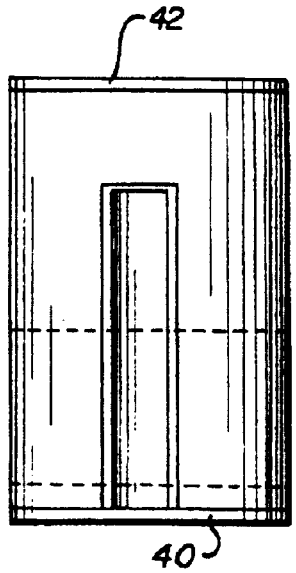
FIG. 2
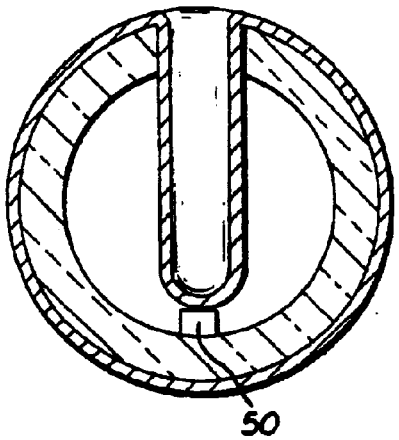
FIG. 3
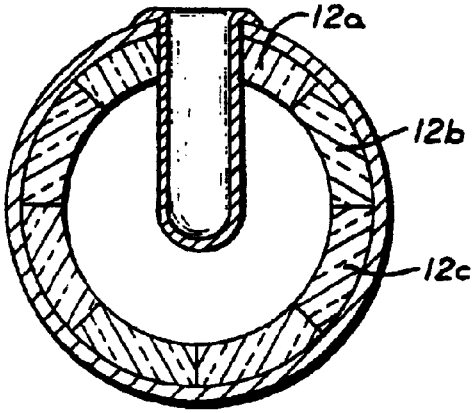
FIG. 4

TRANSDUCER ASSEMBLY

Matter enclosed in heavy brackets [ ] appears in the original patent but forms no part of this reissue specification; matter printed in italics indicates the additions made by reissue.

*This application is a continuation-in-part of U.S. application Ser. No. 07/331,256, filed Mar. 30, 1989, which has issued as U.S. Pat. No. 5,020,035.*

This invention relates to electromechanical transducers and more particularly relates to electromechanical transducers which respond to electrical energy to produce mechanical or acoustic vibrations at particular frequencies. The invention particularly relates to electromechanical transducers which are impervious to corrosive and erosive effects in the atmosphere.

Electromechanical transducers have been in use for decades to convert electrical energy to mechanical or acoustic energy at a particular frequency. The transducers include a transducer member made from a particular material such as a piezoelectric material which expands and contracts at the particular frequency when alternating electrical signals are introduced to the transducer member.

One particular embodiment of an electromechanical transducer includes a transducer member disposed in a looped configuration and having a gap at one position in the loop. This embodiment also includes a support member enveloping the transducer member and having a gap at a position corresponding to the gap in the transducer member. When the transducer member receives alternating electrical signals, the transducer member and the support member vibrate at a particular frequency in a direction to decrease and increase the dimensions of the gap.

Electromechanical transducers are advantageous because they provide an efficient conversion between electrical energy and electromechanical or acoustic energy. The conversion of electrical energy to electromechanical energy or acoustic energy in electromechanical transducers has a number of different uses. For example, they may be used to separate solids from a liquid in a slurry, to clean tubing such as in an oil well, to obtain an enhanced recovery of oil such as in an oil well, to determine the existence of oil in a particular underground location and to mix different chemicals acoustically.

In many uses of electromechanical transducers, the transducers are subjected to corrosive or erosive atmospheres. Furthermore, the transducers are not completely enclosed. This causes the life of the transducers in such corrosive or erosive atmospheres to be limited. For example, depending upon the use made of the transducers, the transducers may be subjected to strong acids, sulfur or strong hydroxides.

The problem discussed in the previous paragraph has existed for decades. During this period of time, a considerable effort has been made, and significant amounts of money have been expended, to solve the problem. In spite of this, no satisfactory solution to the problem has been provided to this time.

This invention provides a transducer assembly which provides an efficient conversion of electrical energy such as alternating electrical signals to electromechanical energy or acoustical energy at a preselected frequency. The transducer assembly can be fabricated to provide the assembly with a controlled Q such that a sharp waveband of frequencies or a wide band of frequencies can be provided. The transducer assembly is enclosed so that it is impervious to corrosion or erosion from the surrounding atmosphere.

In one embodiment of the invention, a support member preferably made of a metal such as cold rolled steel is disposed in a looped configuration and is provided with a gap. A transducer member preferably made of a piezoelectric material such as a ceramic is disposed within the support member. The transducer member is provided with a gap at a position corresponding to the gap in the support member.

A closure member made from a suitable springlike material such as an alloy steel is attached to the opposite ends of the support member at the position of the gap as by welding. The closure member extends in a U-shaped configuration into the looped configurations defined by the support member and the ceramic member. The axial length of the closure member defines the bandwidth of the frequency vibrations generated by the transducer member. When the U-shaped springlike member extends from the gap into the looped configuration to a position near the end of the transducer member and the support member opposite the gap, a bracing member may be disposed between the springlike member and the transducer member to brace the springlike member. The opposite ends of the closure member are closed as by end caps.

In the drawings

FIG. 1 is a sectional view of a transducer assembly constituting one embodiment of the invention;

FIG. 2 is a plan view of the transducer assembly shown in FIG. 1;

FIG. 3 is a sectional view, similar to that shown in FIG. 1, of another embodiment of the invention; and FIG. 4 is a sectional view, similar to that shown in FIG. 1, of a further embodiment of the invention.

In one embodiment of the invention, a transducer generally indicated at 10 includes a transducer member 12 preferably having a looped configuration. For example, the transducer member 12 may have a hollow cylindrical (or annular) configuration and may have a gap 14 extending at least partially along the axial length of the transducer member. The gap 14 may be formed by a diamond blade and may be provided with width corresponding to the width of the blade. For example, the width of the gap 14 may be in the order of a few thousandths of an inch.

The transducer member 12 may be made from a piezoelectric material such as a lead [zircorate] *zirconate* lead [titinate] *titanate* ceramic or from any other suitable material well known in the prior art. As is well known in the art, the member 12 may be provided with a proper ratio of length to diameter to insure operation in a pure "hoop" mode. In other words, the member 12 may be constructed to operate in a radial direction such as the gap 14 may tend to open and close.

A support member 20 may be disposed on the transducer member 12 to envelope the member 12. The support member 20 may be provided with a looped configuration corresponding to the looped configuration of the transducer member 12 and may be provided with a gap 22 corresponding to the gap 14. The support member 20 may be made from a suitable material such as cold rolled steel. The support member 20 operates, by limiting the amplitude of vibrations of the transducer member, to prevent the transducer member 12 from being damaged. The support member may be provided with a gap 22 corresponding in position and width to the gap 14 in the transducer member 12.

A closure member 30 may be suitably attached to the support member 20 at the opposite ends of the gap as by welding. The closure member 30 may be disposed (in section) in a U-shaped configuration which extends into the looped configurations defined by the transducer member 12 and the support member 20. The closure member 30 may be made from a suitable material having springlike properties so that the transducer member 12 and the support member 20 will be able to vibrate when the transducer member 12 receives electrical energy. For example, the closure member 30 may be made from a 413 alloy steel tempered to withstand one hundred and thirty thousand pounds per square inch (130 psi) to one hundred and forty thousand pounds per square inch (140 psi).

In one embodiment of the invention, the transducer member 12 may be provided with an outer diameter of approximately two and one half inches (2½") and may be approximately one eighth of an inch (⅛") thick. The support member 20 may be provided with an outer diameter of approximately two and three quarters inches (2¾") and may be approximately one eighth of an inch (⅛") thick. The closure member 30 may be provided with a thickness of approximately sixty thousands of an inch (0.060"). In another embodiment, the support member 20 may have a thickness of approximately 0.3" and an outer diameter of approximately 3½". The transducer member may have a thickness of approximately 0.27" and the closure member 30 may have a thickness of approximately 0.090".

The closure member 30 is preferably disposed at one axial end of the support member 20. An end cap 40 covers the support member 20 at one end of the support member and an end cap 42 covers the support member 20 at the opposite end of the support member. The end caps 40 and 42 may be made from the same material as the support member 12. In this way, the closure member 30 and the end caps 40 and 42 completely enclose the support member 20 and the transducer member 12 and prevent the transducer member 12 from being affected by corrosion, erosion and leaking.

The closure member 30 may be provided with a variable axial length. As the axial length of the closure member 30 is increased, the frequency of the transducer assembly 10 decreases. This results from the fact that the transducer member 12 and the support member 20 are able to vibrate through an increased amplitude because there is a decreased constraint imposed by the closure member 30 on the transducer member and the support member. Under such circumstances, the mechanical Q of the transducer assembly 10 decreases and the bandwidth of the frequency of vibrations of the transducer assembly increases.

As shown in Figure, the axial lengths of the gap 14 in the transducer member 12 and the gap 22 in the support member 20 extend only partially along the axial lengths of the transducer member and the support member 30. Further as shown in FIG. 2, the length of the closure member 30 corresponds to the lengths of the gaps in the transducer member 12 and the support member 20.

Similarly, as the axial length of the transducer assembly is increased, the mechanical Q of the transducer assembly 10 increases and the frequency bandwidth decreases. This results from the fact that the closure member 30 limits the amplitude of the vibrations in the transducer assembly 10.

The transducer assembly 10 constituting this invention may be used in a number of different applications. For example, it may be used in oil well production to loosen the earth around the oil well. This enhances the removal of oil from the oil well. It can also be used effectively in seismic exploration. This results from the fact that it can provide a high power (as high as approximately 200 db) over a wide frequency range. It can be used to mix different chemicals and it can also be used to separate solids from liquids in chemical plants and refineries and oil wells. The transducer assembly 10 can also be used to clean tubing as in oil wells.

FIG. 3 illustrates a modification of the invention shown in FIGS. 1 and 2 and discussed above. In this modification, the closure member 20 extends downwardly into the looped configurations of the transducer member 12 and the support member 20 through most of the diametrical distance between the gaps in the transducer member 12 and the closure member 20 and the diametrically opposite ends of the transducer member and the closure member. A bracing member 50 is disposed between the bottom of the leg of the closure member 30 and the position of the transducer member 12 diametrically opposite the gap 14 in the transducer member. The bracing member 50 may be made from a suitable electrical insulator such as a phenolic. By providing the bracing member 50, the transducer assembly 10 can be provided with a very high pressure capability since support is provided at the diametrically opposite ends of the transducer member 12 to stiffen the transducer assembly 10.

FIG. 4 illustrates another modification of the invention. In this modification, the transducer member 12 is formed from a plurality of segments (e.g. 12a, 12b, 12c) which are circumferentially poled and are attached together. In this embodiment, the transducer member 12 vibrates in a circumferential direction rather than in a radial direction.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination, a transducer member disposed in a looped configuration and having a gap in the looped configuration and made from a material providing for the introduction of electrical energy and the conversion of this electrical energy to mechanical vibrations, a support member disposed on the transducer member in the looped configuration and having a gap disposed at the same position as the gap in the transducer member, the support member having substantially the same looped configuration as the transducer member, and a member attached to the support member at the opposite ends of the gap in the support member and extending in a U-shaped looped configuration between the opposite ends of the gap in the support member.

2. In a combination as set forth in claim 1, the gap in the transducer member providing an interruption in the looped configuration of the transducer member, the gap in the support member providing an interruption in the looped configuration of the support member, and the attached member extending into the looped configuration defined by the transducer member and the support member, the attached member having a gap providing an interruption in the looped configuration of the attached member.

3. In a combination as set forth in claim 2, the attached member being welded to the support member at the opposite ends of the gap.

4. In a combination as set forth in claim 3, end caps disposed on the support member at the opposite ends of the support member, the end caps and the attached member being made from a non-corrosive material.

5. In combination, a transducer member having a gap and made from a material providing for the introduction of electrical energy and the conversion of this electrical energy to mechanical vibrations, a support member disposed on the transducer member and having a gap disposed at the same position as the gap in the transducer member, and a member attached to the support member at the opposite ends of the gap in the support member and extending in a closed loop between the opposite ends of the gap in the support member, the transducer member and the support member having a particular axial length, and the attached member extending partially along the axial lengths of the transducer member and the support member for adjusting the frequency characteristics of the transducer member.

6. In a combination as set forth in claim 5, the transducer member and the support member having corresponding looped configurations and the attached member having a looped configuration different from the looped configurations of the support member and the transducer member.

7. In combination, a transducer member having a looped configuration and a gap in the looped configuration, the transducer member being responsive to electrical energy to vibrate at a particular frequency, a support member having the looped configuration and having a gap in the looped configuration, the support member enveloping the transducer member with the gap in the support member coinciding in position with the gap in the transducer member, and a member attached to the support member at the opposite ends of the gap and extending into the looped configurations of the transducer member and the support member in a U-shaped looped configuration and having a configuration to close the support member.

8. In combination, a transducer member having a looped configuration and a gap in the looped configuration, the transducer member being responsive to electrical energy to vibrate at a particular frequency, a support member having a looped configuration and a gap in the looped configuration, the support member enveloping the transducer member with the gap in the support member coinciding in position with the gap in the transducer member, and a member attached to the support member at the opposite ends of the gap and extending into the looped configurations of the transducer member and the support member and having a configuration to close the support member, the transducer member and the support member having a particular axial length, the attached member extending only partially along the particular axial length for adjusting the frequency characteristics of the transducer member and means for closing the support member at the opposite ends of the axial length of the support member.

9. In a combination as set forth in claim 8, the attached member being welded to the support member at the opposite ends of the gap in the support member along the axial length of the attached member.

10. In a combination as set forth in claim 8, the attached member extending in a looped configuration into the looped configuration defined by the transducer member and the support member.

11. In a combination as set forth in claim 10, the looped configuration of the attached member being different from the looped configurations of the support member and the transducer member.

12. In a combination as set forth in any of claims 8, 9, 10 [and] *or* 11, the gaps in the support member and the closure member extending only partially along the lengths of the support member and the transducer member, the associated means extending along the lengths of the gaps in the support member and the transducer member.

13. In combination, a support member disposed in a looped configuration and having a gap at one position in the looped configuration, a transducer member disposed with the support member in the looped configuration and having a gap at a position corresponding to the gap in the support member, and means associated with the support member at the gap in the support member and extending into the looped configuration defined by the support member and the transducer member for closing the support member and the transducer member at the gap, and means for closing the support member at the opposite ends of the support member the associated means being supported by the support member at the opposite ends of the gap and having a U-shaped looped configuration.

14. In a combination as set forth in claim 13, the transducer member being constructed to receive electrical energy and to convert the electrical energy into vibrations, the support member, the transducer member and the associated means being constructed to provide the vibrations at a particular frequency.

15. In a combination as set forth in claim 14, the associated means being attached to the support member at the gap in the support member and having a configuration for closing the gap in the support member and the transducer member while providing for the vibration of the support member and the transducer member at the particular frequency, the closure means at the opposite ends of the support member constituting end caps.

16. In a combination as set forth in claim 15, the support member and the associated means and the caps being made from metallic materials and the transducer member being made from a piezoelectric material.

17. In combination, a transducer member made from a piezoelectric material and having a looped configuration and a gap at a particular position in the looped configuration, a support member disposed on the transducer member and having a looped configuration corresponding to the looped configuration of the transducer member and having a gap at a position corresponding to the gap in the transducer member, a closure member attached to the support member at the opposite ends of the gap in the support member and extending from the attached positions into the looped configuration of the transducer member, and a bracing member disposed in the looped configuration of the transducer member in continuously abutting relationship at one end to the transducer member at the position diametrically opposite to the gap in the transducer member and in abutting relationship to the closure member at its opposite end.

18. In a combination as set forth in claim 17, the closure member having a looped configuration different from the looped configurations of the transducer member and the support member.

19. In a combination as recited in claim 18, end caps closing the support member at the opposite ends of the support member, the closure member extending along the support member only partially through the distance between the end caps.

20. In a combination as recited in claim 17, the closure member having springlike properties and the bracing member being made from an electrically insulating material.

21. In a combination as recited in claim 20, end caps closing the support member at the opposite ends of the support member, the closure member extending along the support member only partially through the distance between the end caps.

22. In a combination as set forth in claim 21, the support member, the closure member and the end caps being made from metallic materials.

23. In a combination as set forth in claim 22, the transducer member and the support member having hollow cylindrical configurations and the transducer member being formed from a plurality of segments defining the cylindrical configuration.

24. In a combination as set forth in claim 17, end caps closing the support member at the opposite ends of the support member.

25. In combination, a transducer member disposed in a looped configuration and having a gap in the looped configuration and made from a material providing for the introduction of electrical energy to mechanical vibrations, a support member disposed on the transducer member in the looped configuration and having a gap disposed at the same position as the gap in the transducer member, the support member having substantially the same looped configuration as the transducer member, and a member attached to the support member at the opposite ends of the gap in the support member and extending in a looped configuration, different from the looped configuration in the transducer member and the support member, between the opposite ends of the gap in the support member, the gaps in the support member and the closure member extending only partially along the lengths of the support member and the transducer member for adjusting the frequency characteristics of the transducer member, the attached member extending along the length of the gap.

26. In combination, a transducer member having a looped configuration and a gap in the looped configuration, the transducer member being responsive to electrical energy to vibrate at a particular frequency, a support member having the looped configuration and having a gap in the looped configuration, the support member enveloping the transducer member with the gap in the support member coinciding in position with the gap in the transducer member, and a member attached to the support member at the opposite ends of the gap and extending into the looped configurations of the transducer member and the support member in a looped configuration different from the looped configurations of the transducer member and the support member and having a configuration to close the support member, the gaps in the support member and the closure member extending only partially along the lengths of the support member and the transducer member for adjusting the frequency characteristics of the transducer member, the attached member extending along the length of the gap.

27. In combination, a support member disposed in a looped configuration and having a gap at one position in the looped configuration, a transducer member disposed with the support member in the looped configuration and having a gap at a position corresponding to the gap in the support member, and means associated with the support member at the gap in the support member and extending into the looped configuration defined by the support member and the transducer member for closing the support member and the transducer member at the gap, and means for closing the support member at the opposite ends of the support member, the gaps in the support member and the closure member extending only partially along the lengths of the support member and the transducer member for adjusting the frequency characteristics of the transducer member, the associated means extending along the lengths of the gaps in the support member and the transducer member.

28. In combination, a transducer member made from a piezoelectric material and having a looped configuration and a gap at a particular position in the looped configuration, a support member disposed on the transducer member and having a looped configuration corresponding to the looped configuration of the transducer member and having a gap at a position corresponding to the gap in the transducer member, a closure member attached to the support member at the opposite ends of the gap in the support member and extending from the attached positions into the looped configuration of the transducer member, and a bracing member disposed in the looped configuration of the transducer member in abutting relationship at one end to the transducer member at the position diametrically opposite to the gap in the transducer member and in abutting relationship to the closure member at its opposite end, the gaps in the support member and the closure member extending only partially along the lengths of the support member and the transducer member for adjusting the frequency characteristics of the transducer member, the closure member extending along the lengths of the gaps in the support member and the transducer member.

* * * * *